(12) United States Patent
Van Phan et al.

(10) Patent No.: US 9,473,916 B2
(45) Date of Patent: Oct. 18, 2016

(54) PUBLIC SAFETY SERVICE (75) Inventors: Vinh Van Phan, Oulu (FI); Ling Yu, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/406,825

(22) PCT Filed: Jun. 11, 2012

(86) PCT No.: PCT/EP2012/061004
§ 371 (c)(1),
(2), (4) Date: Dec. 10, 2014

(87) PCT Pub. No.: WO2013/185798
PCT Pub. Date: Dec. 19, 2013

(65) Prior Publication Data
US 2015/0172896 A1   Jun. 18, 2015

(51) Int. Cl.
*H04W 4/22* (2009.01)
*H04W 76/02* (2009.01)
(Continued)

(52) U.S. Cl.
CPC .............. *H04W 4/22* (2013.01); *G06Q 50/265* (2013.01); *H04W 4/021* (2013.01); *H04W 76/007* (2013.01); *H04W 76/023* (2013.01); *H04W 88/04* (2013.01); *H04W 4/005* (2013.01)

(58) Field of Classification Search
CPC ... H04W 76/007; H04W 4/22; H04W 84/06; H04W 8/12; H04W 48/18; H04W 8/26; H04W 76/023; H04W 4/021; H04W 88/04; H04W 4/005; H04M 11/04; H04M 2242/04; H04B 7/18563; H04B 7/18541; H04B 7/18539; G08B 25/016; G06Q 50/265
USPC ........................................................ 455/404.1
See application file for complete search history.

(56) References Cited

U.S. PATENT DOCUMENTS 8,126,510 B1 * 2/2012 Samson ........... H04B 10/25753
                                                                370/315
8,160,539 B1 * 4/2012 Jamshidi .............. H04M 11/045
                                                                379/37

(Continued)

FOREIGN PATENT DOCUMENTS

FI    WO 2013098461 A1 *  7/2013 .......... H04W 76/023
WO    WO 2013/098461 A1    7/2013

OTHER PUBLICATIONS

3GPP TSG-SA WG1 Meeting #56 S1-113010 San Francisco, CA, USA Nov. 14-18, 2011 "FS_ProSe: Public Safety Use Cases".*

(Continued)

*Primary Examiner* — Sharad Rampuria
(74) *Attorney, Agent, or Firm* — Harrington & Smith (57) ABSTRACT

The invention relates to an apparatus including: at least one processor and at least one memory including a computer program code, the at least one memory and the computer program code configured to, with the at least one processor, cause the apparatus at least to: select and configure a commercial user device to operate as a mobile relay agent for public safety usage and/or a public safety device to operate as a mobile relay and/or a mobile gateway for public safety usage, allocate a public safety specific spectrum to device-to-device communications for the public safety usage, and provide mobile backhaul services by using commercial resources.

29 Claims, 3 Drawing Sheets

(51) Int. Cl.
*G06Q 50/26* (2012.01)
*H04W 88/04* (2009.01)
*H04W 76/00* (2009.01)
*H04W 4/02* (2009.01)
*H04W 4/00* (2009.01)

(56) References Cited

U.S. PATENT DOCUMENTS

| | | | | |
|---|---|---|---|---|
| 8,781,442 | B1* | 7/2014 | Link, II | G08G 1/205 370/338 |
| 8,855,645 | B2* | 10/2014 | Bienas | 455/426.1 |
| 2008/0181145 | A1* | 7/2008 | Chowdhury | H04W 4/08 370/310 |
| 2011/0019652 | A1* | 1/2011 | Atwal | H04W 74/002 370/338 |
| 2014/0256365 | A1* | 9/2014 | Schmidt | H04W 4/12 455/466 |
| 2014/0280973 | A1* | 9/2014 | Clancy, III | H04L 5/0037 709/226 |
| 2014/0348083 | A1* | 11/2014 | Mishra | H04L 47/762 370/329 |
| 2015/0029866 | A1* | 1/2015 | Liao | H04W 4/008 370/241 |
| 2015/0172030 | A1* | 6/2015 | Tiirola | H04L 1/1854 370/280 |
| 2015/0173115 | A1* | 6/2015 | Van Phan | H04W 76/023 455/404.2 |
| 2015/0350859 | A1* | 12/2015 | Hiben | H04W 4/22 455/404.1 |

OTHER PUBLICATIONS

3GPP TSG-SA1 Meeting #56 S1-113148 San Francisco, CA (US), Nov. 14-18, 2011; "Use cases for Proximity-based Services study" Alcatel-Lucent, NIST, Nokia Seimens Networks, U.S Cellular.*
3GPP TR 22.803 V12.0.0 (Dec. 2012)Technical Report 3rd Generation Partnership Project;Technical Specification Group Services and System Aspects;Feasibility study for Proximity Services (ProSe) (Release 12).*
TSG SA1 Meeting #56 S1-113009 San Francisco, CA USA, Nov. 14-18, 2011 Public Safety using LTE Direct Communication; Alcatel-Lucent, NIST, Nokia Seimens Networks, U.S Cellular.*
"How will LTE deliver for public safety?"; Analysis Mason Quarterly; Apr. 26, 2011; whole document (4 pages).
Alcatel-Lucent et al.; "FS_ProSe: Public Safety Use Cases"; S1-113010; 3GPP TSG SA1 Meeting #56; San Francisco, CA, USA; Nov. 14-18, 2011; whole document (3 pages).
Alcatel-Lucent et al.; "Public Safety using LTE Direct Communications"; S1-113009; 3GPP TSG SA1 Meeting #56; San Francisco, CA, USA; Nov. 14-18, 2011; whole document (4 pages).
3GPP TR 22.803 V0.3.0 (May 2012); "$3^{rd}$ Generation Partnership Project; Technical Specification Group SA, Feasibility Study for Proximity Services (ProSe) (Release 12)"; May 2012; pp. 1-24, sections 1, 4, 5.2, 6.1.
"Use cases for Proximity-based Services study"; S1-113148; 3GPP TSG-SA1 Meeting #56; San Francisco, CA, USA; Nov. 14-18, 2011; whole document (4 pages).
ETSI TR 103 064 V1.1.1 (Apr. 2011); "Reconfigurable Radio Systems (RRS), Business and Cost considerations of Software Defined Radio (SDR) and Cognitive Radio (CR) in the Public Safety domain"; Apr. 2011; pp. 1-35, sections 5.3, 6, 8.2, table 1.

* cited by examiner

PUBLIC SAFETY SERVICE

FIELD

The invention relates to apparatuses, methods, systems, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

LTE and LTE-Advanced have been mandated as radio access technology (RAT) for public safety (PS) networks (PSN). Public safety covers a variety of different security functions from safeguarding citizens against natural disasters, to countering terrorism and organized crime, etc. In PS networks mobile devices may communicate directly with each other in a device-to-device (D2D) mode or in a so called direct mode.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: select and configure a commercial user device to operate as a mobile relay agent for public safety usage and/or a public safety device to operate as a mobile relay and/or a mobile gateway for public safety usage, allocate a public safety specific spectrum to device-to-device communications for the public safety usage, and provide mobile backhaul services by using commercial resources.

According to an aspect of the present invention, there is provided an apparatus comprising: at least one processor and at least one memory including a computer program code, the at least one memory and the computer program code configured to, with the at least one processor, cause the apparatus at least to: obtain a configuration message from a commercial network to operate as a mobile relay and/or a mobile gateway for public safety usage, wherein mobile backhaul services are provided by the commercial network and by using commercial resources, and device-to-device communications for the public safety usage are provided by using public safety resources.

According to yet another aspect of the present invention, there is provided a method comprising: selecting and configuring a commercial user device to operate as a mobile relay agent for public safety usage and/or a public safety device to operate as a mobile relay and/or a mobile gateway for public safety usage, allocating a public safety specific spectrum to device-to-device communications for the public safety usage, and providing mobile backhaul services by using commercial resources.

According to yet another aspect of the present invention, there is provided a method comprising: obtaining a configuration message from a commercial network to operate as a mobile relay and/or a mobile gateway for public safety usage, wherein mobile backhaul services are provided by the commercial network and by using commercial resources, and device-to-device communications for the public safety usage are provided by using public safety resources.

According to yet another aspect of the present invention, there is provided an apparatus comprising: means for selecting and configuring a commercial user device to operate as a mobile relay agent for public safety usage and/or a public safety device to operate as a mobile relay and/or a mobile gateway for public safety usage, means for allocating a public safety specific spectrum to device-to-device communications for the public safety usage, and means for providing mobile backhaul services by using commercial resources.

According to yet another aspect of the present invention, there is provided an apparatus comprising: means for obtaining a configuration message from a commercial network to operate as a mobile relay and/or a mobile gateway for public safety usage, wherein mobile backhaul services are provided by the commercial network and by using commercial resources, and device-to-device communications for the public safety usage are provided by using public safety resources.

According to yet another aspect of the present invention, there is provided a computer program embodied on a computer-readable storage medium, the computer program comprising program code for controlling a process to execute a process, the process comprising: selecting and configuring a commercial user device to operate as a mobile relay agent for public safety usage and/or a public safety device to operate as a mobile relay and/or a mobile gateway for public safety usage, allocating a public safety specific spectrum to device-to-device communications for the public safety usage, and providing mobile backhaul services by using commercial resources.

According to yet another aspect of the present invention, there is provided a computer program embodied on a computer-readable storage medium, the computer program comprising program code for controlling a process to execute a process, the process comprising: obtaining a configuration message from a commercial network to operate as a mobile relay and/or a mobile gateway for public safety usage, wherein mobile backhaul services are provided by the commercial network and by using commercial resources, and device-to-device communications for the public safety usage are provided by using public safety resources.

LIST OF DRAWINGS

Some embodiments of the present invention are described below, by way of example only, with reference to the accompanying drawings, in which.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS).

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Such required information is usually signalled to the (e)NodeB.

Figure 1:
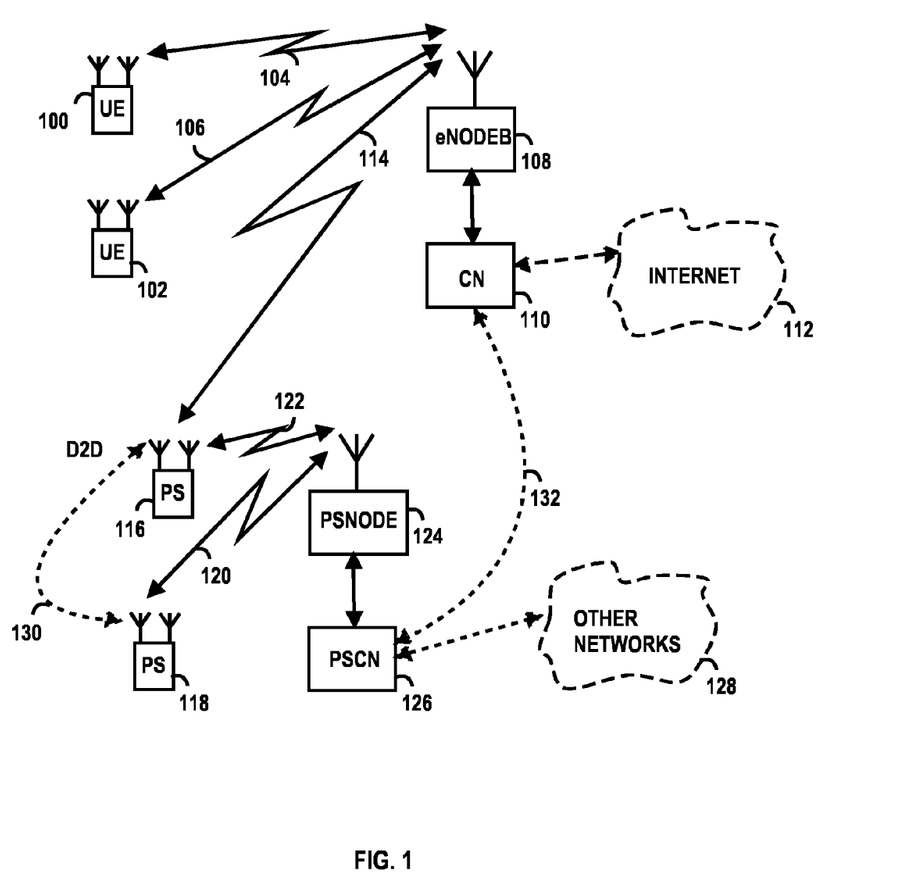
FIG. 1 illustrates an example of a system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104 and 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeBs of FIG. 1 may provide any kind of these cells. A cellular radio system may be implemented as a multilayer network including several kinds of cells. Typically, in multilayer networks, one node B provides one kind of a cell or cells, and thus a plurality of (e) Node Bs are required to provide such a network structure.

Recently for fulfilling the need for improving the deployment and performance of communication systems, the concept of "plug-and-play" (e)NodeBs has been introduced. Typically, a network which is able to use "plug-and-play" (e)Node (e)Bs, includes, in addition to Home (e)NodeBs (H(e)nodeBs), a home node B gateway, or HNB-GW (not shown in FIG. 1). A HNB Gateway (HNB-GW), which is typically installed within an operator's network may aggregate traffic from a large number of HNBs back to a core network.

LTE and LTE-Advanced have been mandated as radio access technology (RAT) for public safety (PS) networks (PSN). Public safety covers a variety of different security functions from safeguarding citizens against natural disasters, to countering terrorism and organized crime, etc. In PSN networks mobile devices may communicate directly with each other in a device-to-device (D2D) mode or in a so called direct mode.

FIG. 1 illustrates one example of an LTE or LTE-Advanced architecture based public safety network. Two PS (user) devices exist 116, 118 which have bi-directional radio connections 120, 122 to PS node 124 which in turn is coupled to PS core network 126. The PS network may get access to other networks 128, 132, such as commercial mobile networks. The PSN may also support device-to-device (D2D) communications 130. PS node and PS core network may operate in a similar manner as a (e)NodeB and core network in the LTE, respectively, taken into consideration possible special needs of public safety services.

It should be appreciated that the depicted PSN (or a part of PSN) is a simplified example based on flat architecture without a base station controller, and shown herein only for clarification. The other part of the exemplifying network of FIG. 1 explained above may be taken as an example of a commercial network. The example of FIG. 1 should not be taken as limiting the implementation of embodiments.

A PSN is usually separated from commercial networks operating independently using own operation modes and dedicated radio bands or carriers. It should be appreciated that in some countries, such as in the US, public safety spectrum may be opened up for commercial use as a secondary user of the spectrum. In this case, both commercial and public safety networks may use the same spectrum or even share the same network, given priority for public safety usage. In general, the PSN must be fast, reliable, secure and as neutral as possible to the lack of network coverage, lack of resources or any type of network failures. Additionally, it is quite probable that in the future, the usage of public safety networks will be enhanced, or at least a need exists, to take advantage of improved functionality of mobile networks, such as transmitting data back in real time from the place of incident or transmitting data in real time to officers working and making decisions in the field. Thus, advanced direct device-to-device (D2D) communications are expected as prominent features of PSN.

Some typical requirements for PSN are: availability even in times of a major incident, even when a power outage takes place, a public-safety organisation must have the control of the network, the network must be secure without a risk of interception and protected against unauthorised access attempts, include a fast call set-up time and a voice codec suitable for high noise environments.

In the case, when a PSN has coverage problem, some commercial cellular networks may still be available, at least partially, over the service area of the PSN in interest or the surrounding area thereof. It can be expected that the PSN users in such a service area may try to use D2D mode of the PSN or the available commercial cellular access to communicate with each other and/or to reach a remote command centre in the PSN. Thus a question arises how to utilize available radio access options to ensure sufficient communications for PSN users. It should be understood that even if the available commercial cellular access network is able to react fast by giving the highest priority for PSN users, no guarantee can be given that cellular capacity and capability at the site at issue are sufficient. Additionally, attention should be paid to the assistance of the cellular network required for establishing and maintaining adequate mobile connectivity for conducting communications.

One embodiment may be carried out by a device configured to operate as a network apparatus, such as a server, (e)node or host. The embodiment may also be provided as a cloud service. The embodiment starts in block 200 of FIG. 2.

Figure 2:
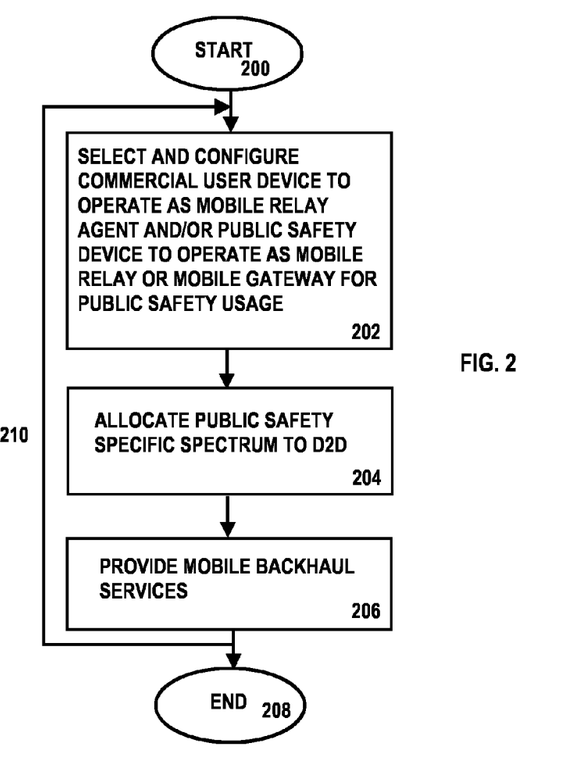
FIG. 2 is a flow chart.

In block 202, a commercial user device is selected and configured to operate as a mobile relay agent for public safety usage, or a public safety device is selected and configured to operate as a mobile relay and/or a mobile gateway for public safety usage.

Either a suitable commercial device located in or around the area, wherein public safety network usage is failed or interrupted, may be selected to act as a mobile relay agent for PS users. Another option is to select a suitable PS device which upon detection of local PSN coverage problem may roam and get coupled to the available commercial network and act as either a mobile relay or mobile gateway for PS users. It should be appreciated that one or more devices may be selected and configured according to current needs, such as capacity needs.

In block 204, a public safety specific spectrum is allocated to device-to-device communications for the public safety usage.

A public safety specific spectrum may be a part of the spectrum allocated for the commercial network. Thus, the usage may be shared, for instance, in such a manner that the public safety usage may have a higher priority than "normal" commercial usage. Normally the period the commercial network is used for public safety communications is quite short and the public safety communications takes place therein only occasionally.

In block 206, mobile backhaul services are provided by using commercial resources.

The term "commercial resources" may herein mean spectrum used or provided for use by the commercial, that is not PS, network.

The LTE brings along high-speed connections the support for real time video and other multimedia applications. High speed and capacity requirements put demands on mobile backhaul networks as well. The LTE backhaul is based on packet data architecture.

D2D connections of PS users are usually kept up to operate in a PSN specific spectrum or carrier(s), whereas a backhaul connection for a mobile relay or mobile gateway between the selected commercial device or PS device and the serving (e)NB may be provided by using commercial cellular network resources, such as spectrum. These options, in the light of LTE-Advanced carrier aggregation, may be considered as kind of inter-system or inter-operator carrier aggregation for possible D2D based out-band mobile relays.

In one embodiment, when a PS device is out of the coverage of a public safety network, at least all D2D communications between PS devices (including D2D mobile relaying links) use PS dedicated spectrum. The PS device may, however, roam to a commercial network. The PS device, when being out of the coverage of the public safety network but inside the coverage of the commercial network, may try to get access (roam) to the commercial network for communicating with its command centre or server in the public safety network. Additionally, either the roaming PS device itself or the public safety network may request the commercial network to provide a backhaul connection to the PS device for it being able to act as a mobile relay, mobile relay agent or mobile gateway for other PS devices using the PS dedicated spectrum for all D2D links.

It should be appreciated that a commercial device or a PS device providing relaying to PS devices for D2D communications, a commercial network may obtain PS D2D related configuration information from a command centre or an operation and maintenance server of a public safety network.

First we will examine the option of using a commercial user device. In this context, term "commercial user device" is used to describe that the user device is not a dedicated PSN device.

In one embodiment, having been notified and requested by a PSN counterpart (corresponding entity of the PSN may be an operations, administration and maintenance (OAM) server, a PS device or PSN network server) to provide access and assistance for PS users over the service area in question, a commercial network may find, select and configure a suitable commercial user device, whether initially in a connected state or in an idle state, and being present in or around the service area in question, and configure it to operate as a mobile relay agent for PS users. A network may provide a PS specific spectrum allocation for D2D communications and mobile backhaul services by using commercial network spectrum. Due to security reasons, the selected commercial user device may only be used as a mobile relay agent and not as mobile gateway for PS users. In this case, the commercial network is responsible for initiating the selection and controlling the mobile relay agent and D2D relay operations to ensure secure and sufficient access for PS users. Additionally, PS traffic may be given a higher priority than that of the selected commercial user device.

A selected commercial user device may be configured to broadcast designated information to PS users to enable them to find and receive targeted information, authenticate and select a serving mobile relay agent to get access to a PS network. The broadcast information may comprise a designated authentic identity of the user device and mobile relay agent, system information related to the (serving) commercial network and a "home" or original PSN, and device access information. For enhancing authentication, a part of the broadcast information may be ciphered with a predefined key known by the PS users as specified for the PSN.

A selected commercial user device may be configured to receive and spread public warning information or PS instructions from PS users over D2D links.

Now we will examine the option of using a PS device.

In one embodiment, having been notified and requested by a PSN counterpart (corresponding entity of the PSN may be an operations, administration and maintenance (OAM) server, a PS device or PSN network server) to provide access and assistance for PS users over the service area in question, a commercial network may find select and configure a suitable PS device, which has roamed and got access to the commercial network, to operate as either a mobile relay or mobile gateway for PS users. The new mobile relay or gateway may use PS specific spectrum allocation for D2D communications and a mobile backhaul link provided by the (serving) commercial network. The "home" or original PSN may assist in this "network-initiated selection" in such a manner that it requests the commercial network to select a specific PS device for the PS purposes to be carried out in the commercial network.

In the case wherein the selected PS device is configured to operate as a mobile relay, a (serving) commercial network may be responsible for controlling the mobile relay and D2D relay operations to ensure secure and sufficient access for PS users. The selected PS device may have a higher priority, when it operates as a mobile relay, compared to other PS devices or all PS users may have a same priority.

In the case wherein the selected PS device is configured to operate as a mobile gateway, the (serving) commercial network may be responsible for providing secure and sufficient mobile backhaul connection for the PS mobile gateway device. The PS mobile gateway and D2D operations between PS users may be carried out accordingly to those of the "home" PSN. These D2D communications based connections of PS devices may be maintained transparent to the (serving) commercial network. The commercial network may obtain a request from a public safety network to provide access for public safety users and assistance for public safety usage over a service area of interest. The commercial network may then configure a PS mobile gateway and D2D operations.

In one embodiment, the PS device which has roamed and got access to a commercial network may initiate a request to the (serving) commercial network in order to operate as a D2D mobile relay or mobile gateway device for PS users. The (serving) commercial network may configure and control the requesting PS device and provide it with requested backhaul link accordingly.

A selected PS device may be configured to broadcast designated information to PS users to enable them to find and receive targeted information, authenticate and select a serving mobile relay agent to get access to a PS network. The broadcast information may comprise a designated authentic identity of a mobile relay or gateway, system information related to the (serving) commercial network and a "home" or original PSN, and device access information. For enhancing authentication, a part of the broadcast information may be ciphered with a predefined key known by the PS users as specified for the PSN. Additionally, a part of broadcast system information (PS device identity, PSN related system information, ciphering key) may be available or generated by the selected PS device.

A selected PS device acting as a mobile gateway for PS users may be configured to broadcast system information related to the (serving) commercial network to the PS users to facilitate efficient radio measurement, roaming, possible direct access and handover to the commercial network for the PS users.

Further options may also be provided: for example, a PS device configured to operate as a D2D mobile gateway for PS users may be coupled to the (serving) commercial network for backhauling via a selected commercial device configured and controlled to operate as a D2D mobile relay agent for the PS users. Further multi-hop extensions may also be considered while maintaining D2D communications between PS devices, and between the PS device and the PS mobile relay agent.

A commercial network may be requested to provide necessary access and assistance for PS users. The PS users may detect PSN out-of-coverage problems as well as available commercial networks in or around the service area in question based on regular radio measurements. Then the PS users may roam and get access to a selected commercial cellular network to report the (serving) commercial network directly or by a "home" or original PSN about the detected problems. Commercial users and network may assist in detecting and reporting the PSN coverage problems. PSN failures may also be detected by the PS network. The commercial network may be notified or requested to assist the PS users in the service area by the PSN. The PSN may provide the commercial network with all necessary PS network configuration information including D2D related information: spectrum and/or carrier information, security and system information for PS D2D mobile beaconing, etc.

The embodiment ends in block 208. The embodiment is repeatable in many ways. One example is shown by arrow 210 in FIG. 2.

Another embodiment may be carried out by a device configured to operate as a public safety device. The embodiment starts in block 300 of FIG. 3.

Figure 3:
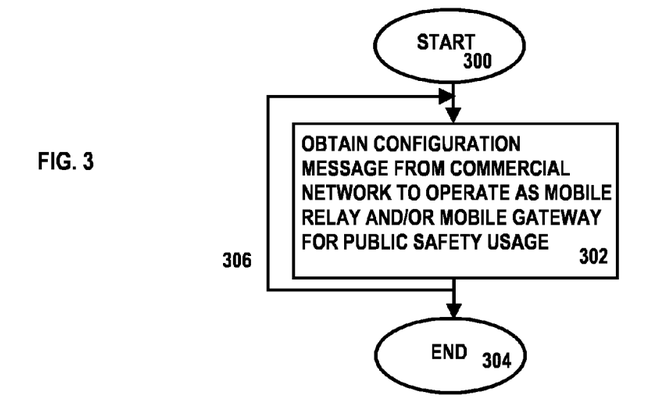
FIG. 3 is another flow chart.

In block 302, a configuration message from a commercial network to operate as a mobile relay and/or a mobile gateway for public safety usage is obtained, wherein mobile backhaul services are provided by the commercial network and by using commercial resources and device-to-device communications for the public safety usage are provided by using public safety resources.

A commercial network may find, select and configure a suitable PS device, which has roamed and got access to the commercial network, to operate as either a mobile relay or mobile gateway for PS users. The new mobile relay or gateway may use PS specific spectrum allocation for D2D communications and a mobile backhaul link provided by the (serving) commercial network. The "home" or original PSN may assist in this "network-initiated selection" in such a manner that it requests the commercial network to select a specific PS device for the PS purposes to be carried out in the commercial network.

In the case wherein the selected PS device is configured to operate as a mobile relay, a (serving) commercial network may be responsible for controlling the mobile relay and D2D relay operations to ensure secure and sufficient access for PS users. The selected PS device may have a higher priority, when it operates as a mobile relay, compared to other PS devices or all PS users may have a same priority.

In the case wherein the selected PS device is configured to operate as a mobile gateway, the (serving) commercial network may be responsible for providing secure and sufficient mobile backhaul connection for the PS mobile gateway device. The PS mobile gateway and D2D operations between PS users may be carried out accordingly to those of the "home" PSN. These D2D "home" PSN communications based connections of PS devices may be maintained kept transparent to the (serving) commercial network.

In one embodiment, the PS device which has roamed and got access to a commercial network may initiate a request to the (serving) commercial network in order to operate as a D2D mobile relay or mobile gateway device for PS users. The (serving) commercial network may configure and control the requesting PS device and provide it with requested backhaul link accordingly.

A configuration message from a commercial network to operate as a mobile relay and/or a mobile gateway for public safety usage may be originated from a public safety network or from a request made by the public safety network. Additionally, in the case a public safety device is selected and configured to operate as mobile gateway, the configuration message may be originated from the public safety network via a radio access connection provided by the commercial network.

A selected PS device may be configured to broadcast designated information to PS users to enable them to find and receive targeted information, authenticate and select a serving mobile relay agent to get access to a PS network. The broadcast information may comprise a designated authentic identity of a mobile relay or gateway, system information related to the (serving) commercial network and a "home" or original PSN, and device access information. For enhancing authentication, a part of the broadcast information may be ciphered with a predefined key known by the PS users as specified for the PSN. Additionally, a part of broadcast system information (PS device identity, PSN related system information, ciphering key) may be available or generated by the selected PS device.

A selected PS device acting as a mobile gateway for PS users may be configured to broadcast system information related to the (serving) commercial network to the PS users to facilitate efficient radio measurement, roaming, possible direct access and handover to the commercial network for the PS users.

Further options may also be provided: for example, a PS device configured to operate as a D2D mobile gateway for PS users may be coupled to the (serving) commercial network for backhauling via a selected commercial device configured and controlled to operate as a D2D mobile relay agent for the PS users. Further multi-hop extensions may also be considered while maintaining D2D communications between PS devices, and between the PS device and the PS mobile relay agent.

Additionally, PS devices may detect PSN out-of-coverage problems as well as available commercial networks in or around the service area in question based on regular radio measurements. Then the PS devices may roam and get access to a selected commercial cellular network to report the (serving) commercial network directly or by a "home" or original PSN about the detected problems. Commercial users and network may assist in detecting and reporting the PSN coverage problems. PSN failures may also be detected by the PS network. The commercial network may be notified or requested to assist the PS devices in the service area by the PSN. The PSN may provide the commercial network with all necessary PS network configuration information including D2D related information: spectrum and/or carrier information, security and system information for PS D2D mobile beaconing, etc.

The embodiment ends in block 304. The embodiment is repeatable in many ways. One example is shown by arrow 306 in FIG. 3.

The steps/points, signaling messages and related functions described above in FIGS. 2 and 3 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, broadcasting, signalling transmitting and/or receiving may herein mean preparing a data conveyance, broadcast, transmission and/or reception, preparing a message to be conveyed, broadcasted, signalled, transmitted and/or received, or physical transmission and/or reception itself, etc. on a case by case basis. The same principle may be applied to terms transmission and reception as well.

An embodiment provides an apparatus which may be any node, host, server, web stick or any other suitable apparatus capable to carry out processes described above in relation to FIG. 2.

It should be appreciated that an apparatus may include or otherwise be in communication with a control unit, one or more processors or other entities capable of carrying out operations according to the embodiments described by means of FIG. 2. It should be understood that each block of the flowchart of FIG. 2 and any combination thereof may be implemented by various means or their combinations, such as hardware, software, firmware, one or more processors and/or circuitry.

Figure 4:
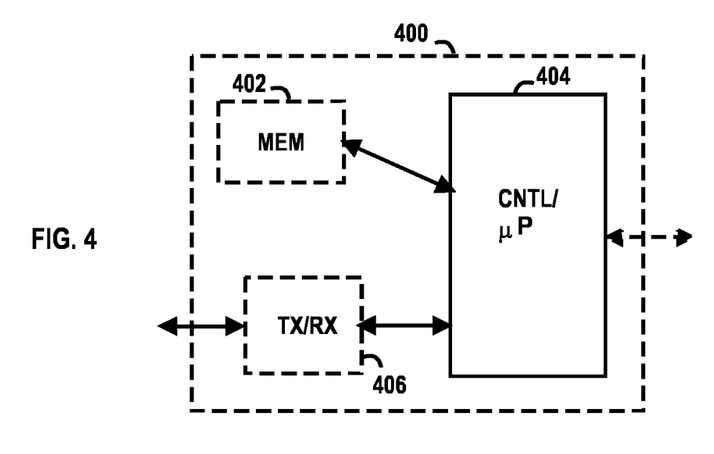
FIG. 4 illustrates examples of apparatuses.

FIG. 4 illustrates a simplified block diagram of an apparatus according to an embodiment.

As an example of an apparatus according to an embodiment, it is shown apparatus 400, such as a node, including facilities in control unit 404 (including one or more processors, for example) to carry out functions of embodiments according to FIG. 2. The facilities may be software, hardware or combinations thereof as described in further detail below.

In FIG. 4, block 406 includes parts/units/modules needed for reception and transmission, usually called a radio front end, RF-parts, radio parts, radio head, etc.

Another example of apparatus 400 may include at least one processor 404 and at least one memory 402 including a computer program code, the at least one memory and the computer program code configured to, with the at least one processor, cause the apparatus at least to: select and configure a commercial user device to operate as a mobile relay agent for public safety usage and/or a public safety device to operate as a mobile relay and/or a mobile gateway for public safety usage, allocate a public safety specific spectrum to device-to-device communications for the public safety usage, and provide mobile backhaul services by using commercial resources.

Yet another example of an apparatus comprises means 404 (406) for selecting and configuring a commercial user device to operate as a mobile relay agent for public safety usage and/or a public safety device to operate as a mobile relay and/or a mobile gateway for public safety usage, means 404 (406) for allocating a public safety specific spectrum to device-to-device communications for the public safety usage, and means 404 (406) for providing mobile backhaul services by using commercial resources.

Yet another example of an apparatus comprises a controller configured to select and configure a commercial user device to operate as a mobile relay agent for public safety usage and/or a public safety device to operate as a mobile relay and/or a mobile gateway for public safety usage, an allocator configured to allocate a public safety specific spectrum to device-to-device communications for the public safety usage, and a provider configured to provide mobile backhaul services by using commercial resources.

It should be understood that the apparatuses may include or be coupled to other units or modules etc., such as radio parts or radio heads, used in or for transmission and/or reception. This is depicted in FIG. 4 as optional block 406.

Although the apparatuses have been depicted as one entity in FIG. 4, different modules and memory may be implemented in one or more physical or logical entities.

An embodiment provides an apparatus which may be any user device or any other suitable apparatus capable to carry out processes described above in relation to FIG. 3. It should be appreciated that the apparatus may be a user device of a commercial network or a public safety network, when configured to operate as a mobile relay (or mobile relay agent) and/or a user device of a public safety network, when configured to operate as a mobile gateway.

It should be appreciated that an apparatus may include or otherwise be in communication with a control unit, one or more processors or other entities capable of carrying out operations according to the embodiments described by means of FIG. 3. It should be understood that each block of the flowchart of FIG. 3 and any combination thereof may be implemented by various means or their combinations, such as hardware, software, firmware, one or more processors and/or circuitry.

Figure 5:
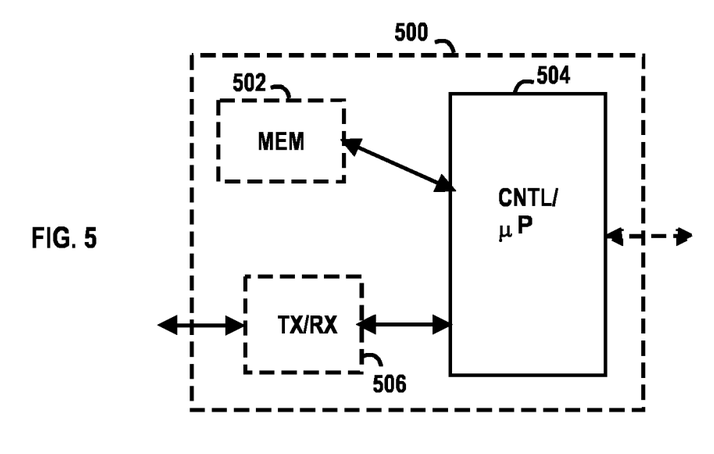
FIG. 5 illustrates other examples of apparatuses.

FIG. 5 illustrates a simplified block diagram of an apparatus according to an embodiment.

As an example of an apparatus according to an embodiment, it is shown apparatus 500, such as a node, including facilities in control unit 504 (including one or more processors, for example) to carry out functions of embodiments according to FIG. 3. The facilities may be software, hardware or combinations thereof as described in further detail below.

In FIG. 5, block 506 includes parts/units/modules needed for reception and transmission, usually called a radio front end, RF-parts, radio parts, radio head, etc.

Another example of apparatus 500 may include at least one processor 504 and at least one memory 502 including a computer program code, the at least one memory and the computer program code configured to, with the at least one processor, cause the apparatus at least to: obtain a configuration message from a commercial network to operate as a mobile relay and/or a mobile gateway for public safety usage, wherein mobile backhaul services are provided by the commercial network and by using commercial resources, and device-to-device communications for the public safety usage are provided by using public safety resources.

Yet another example of an apparatus comprises means 504 (506) for obtaining a configuration message from a commercial network to operate as a mobile relay and/or a mobile gateway for public safety usage, wherein mobile backhaul services are provided by the commercial network and by using commercial resources, and device-to-device communications for the public safety usage are provided by using public safety resources.

Yet another example of an apparatus comprises an obtaining unit configured to obtain a configuration message from a commercial network to operate as a mobile relay and/or a mobile gateway for public safety usage, wherein mobile backhaul services are provided by the commercial network and by using commercial resources, and device-to-device communications for the public safety usage are provided by using public safety resources.

It should be understood that the apparatuses may include or be coupled to other units or modules etc., such as radio parts or radio heads, used in or for transmission and/or reception. This is depicted in FIG. 5 as optional block 506.

Although the apparatuses have been depicted as one entity in FIG. 5, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured to, with the at least one processor, cause the apparatus at least to:
   select and configure a commercial user device to operate as a mobile relay agent for public safety usage and/or a public safety device to operate as a mobile relay and/or a mobile gateway for public safety usage;
   allocate a public safety specific spectrum to device-to-device communications for the public safety usage, and provide mobile backhaul services by using commercial resources, wherein the mobile backhaul services are provided by a request obtained from the public safety device or a public safety network.

2. The apparatus of claim 1, further comprising causing the apparatus to:
obtain a request from a public safety network to provide access for public safety users and assistance for public safety usage over a service area of interest.

3. The apparatus of claim 1, wherein the commercial user device is selected based on a suitable service area, location and capability information.

4. The apparatus of claim 1, further comprising causing the apparatus to:
control the mobile relay agent and/or the mobile relay and device-to-device operations for public safety usage.

5. The apparatus of claim 1, wherein the public safety device is selected among the public safety devices which have roamed and got access to a commercial network.

6. The apparatus of claim 1, wherein the public safety device is selected among the public safety devices which have roamed and got access to a commercial network and wherein the public safety device uses the commercial network for communicating with its command centre or server in a public safety network.

7. The apparatus of claim 1, wherein the configuring further comprises causing the apparatus to:
configure a selected device to broadcast information to public safety users to enable them to get access to public safety services.

8. The apparatus of claim 1, further comprising causing the apparatus to:
couple the public safety device selected to operate as a mobile gateway for public safety usage to a commercial network for backhauling via the user device to operate as a mobile relay agent for public safety usage.

9. The apparatus according to claim 1, wherein the commercial user device is selected and configured to operate as the mobile relay agent for public safety usage.

10. An apparatus comprising:
at least one processor and at least one memory including a computer program code, the at least one memory and the computer program code configured to, with the at least one processor, cause the apparatus at least to:
request mobile backhaul services from a commercial network, and
obtain a configuration message from the commercial network to operate as a mobile relay and/or a mobile gateway for public safety usage, wherein the mobile backhaul services are provided by the commercial network and by using commercial resources, and device-to-device communications for the public safety usage are provided by using public safety resources.

11. The apparatus of claim 10, wherein the configuration message is originated from a public safety network or from a request made by the public safety network.

12. The apparatus of claim 10, further comprising causing the apparatus to:
use the commercial network for communicating with its command centre or server in a public safety network.

13. The apparatus of claim 10, further comprising causing the apparatus to:
broadcast information to public safety users to enable them to get access to public safety services.

14. The apparatus of claim 10, the apparatus comprising a user device of the commercial network or a public safety network, when configured to operate as the mobile relay and/or the apparatus comprising a user device of the public safety network, when configured to operate as the mobile gateway.

15. The apparatus according to claim 10, wherein the apparatus is a commercial user device.

16. A method comprising:
selecting and configuring a commercial user device to operate as a mobile relay agent for public safety usage and/or a public safety device to operate as a mobile relay and/or a mobile gateway for public safety usage;
allocating a public safety specific spectrum to device-to-device communications for the public safety usage, and
providing mobile backhaul services by using commercial resources, wherein the mobile backhaul services are provided by a request obtained from the public safety device or a public safety network.

17. The method of claim 16, further comprising:
obtaining a request from a public safety network to provide access for public safety users and assistance for public safety usage over a service area of interest.

18. The method of claim 16, wherein the commercial user device is selected based on a suitable service area, location and capability information.

19. The method of claim 16, further comprising:
controlling the mobile relay agent and/or the mobile relay and device-to-device operations for public safety usage.

20. The method of claim 16, wherein the public safety device is selected among the public safety devices which have roamed and got access to a commercial network.

21. The method of claim 16, wherein the public safety device is selected among the public safety devices which have roamed and got access to a commercial network and wherein the public safety device uses the commercial network for communicating with its command centre or server in a public safety network.

22. The method of claim 16, wherein the configuring further comprises:
configuring a selected device to broadcast information to public safety users to enable them to get access to public safety services.

23. The method of claim 16, further comprising:
coupling the public safety device selected to operate as a mobile gateway for public safety usage to a commercial network for backhauling via the user device to operate as a mobile relay agent for public safety usage.

24. The method according to claim 16, wherein the commercial user device is selected and configured to operate as the mobile relay agent for public safety usage.

25. A method comprising:
requesting mobile backhaul services from a commercial network, and
obtaining a configuration message from the commercial network to operate as a mobile relay and/or a mobile gateway for public safety usage, wherein the mobile backhaul services are provided by the commercial network and by using commercial resources, and device-to-device communications for the public safety usage are provided by using public safety resources.

26. The method of claim 25, wherein the configuration message is originated from a public safety network or from a request made by the public safety network.

27. The method of claim 25, further comprising:
using the commercial network for communicating with its command centre or server in a public safety network.

28. The method of claim 25, further comprising:
broadcast information to public safety users to enable them to get access to public safety services.

29. The method according to claim 25, wherein the method is performed by a commercial user device.

* * * * *